(12) United States Patent
Lindahl

(10) Patent No.: US 11,466,791 B2
(45) Date of Patent: Oct. 11, 2022

(54) BISTABLE HYDRAULIC SOLENOID VALVE

(71) Applicant: The Boeing Company, Chicago, IL (US)

(72) Inventor: Gary M. Lindahl, Newcastle, WA (US)

(73) Assignee: THE BOEING COMPANY, Chicago, IL (US)

( * ) Notice: Subject to any disclaimer, the term of this patent is extended or adjusted under 35 U.S.C. 154(b) by 111 days.

(21) Appl. No.: 16/846,190

(22) Filed: Apr. 10, 2020

(65) Prior Publication Data
US 2021/0317927 A1    Oct. 14, 2021

(51) Int. Cl.
*F16K 31/08* (2006.01)
*F16K 11/07* (2006.01)
*F16K 31/06* (2006.01)

(52) U.S. Cl.
CPC ........ *F16K 31/082* (2013.01); *F16K 11/0708* (2013.01); *F16K 31/0613* (2013.01)

(58) Field of Classification Search
USPC ............ 137/315.03, 599.07, 909; 251/129.1
See application file for complete search history.

(56) References Cited

U.S. PATENT DOCUMENTS

| | | | | |
|---|---|---|---|---|
| 2,967,545 A * | 1/1961 | Schmidt | ............. | F16K 31/0613 137/625.65 |
| 3,326,236 A * | 6/1967 | Beckett | ................... | F15B 11/15 137/624.14 |
| 3,847,371 A * | 11/1974 | Norton | ................ | F16K 11/0704 251/65 |
| 4,203,571 A * | 5/1980 | Ruchser | ............. | F16K 11/0704 137/625.66 |
| 5,670,041 A * | 9/1997 | Cho | ........................ | C02F 1/487 210/222 |

(Continued)

FOREIGN PATENT DOCUMENTS

DE    2614004 A1    10/1976
EP    1288489 A2    3/2003

OTHER PUBLICATIONS

European Patent Office, Extended European Search Report Issued in Application No. 21156568.4, dated Jul. 28, 2021, Germany, 12 pages.

*Primary Examiner* — Daphne M Barry
(74) *Attorney, Agent, or Firm* — Alleman Hall Creasman & Tuttle LLP

(57) ABSTRACT

A bistable hydraulic solenoid valve has a valve spool that transitions between two positions, remaining in one of the two positions under an attractive magnetic force when the solenoids are not energized. The valve spool has a first permanent magnet attached to one end and a second permanent magnet attached to the other end, so that the first permanent magnet faces a first solenoid, and the second permanent magnet faces a second solenoid. The first solenoid is energized to have a first polarity, and the second solenoid is energized to have an opposite polarity to concurrently push and pull the valve spool within the valve body between a first position and a second position, the first position establishing a first flow path and the second position establishing a second flow path through the valve body and valve spool so as to enable flow of hydraulic fluid.

20 Claims, 7 Drawing Sheets

(56) References Cited

U.S. PATENT DOCUMENTS

| | | | |
|---|---|---|---|
| 5,937,904 A * | 8/1999 | Wunder | F16K 31/0679 137/625.65 |
| 6,152,172 A * | 11/2000 | Christianson | F15B 13/0402 137/554 |
| 6,460,557 B1 | 10/2002 | Levitan et al. | |
| 6,659,121 B1 * | 12/2003 | Takahashi | F16K 31/0689 137/546 |
| 8,567,758 B2 * | 10/2013 | Bouten | F16K 31/0689 251/129.1 |
| 2002/0046717 A1 * | 4/2002 | Buehrle, II | F01L 13/06 123/90.12 |
| 2009/0159823 A1 | 6/2009 | Matsunaga et al. | |
| 2010/0095917 A1 | 4/2010 | Najmolhoda et al. | |
| 2016/0239025 A1 | 8/2016 | van der Merwe et al. | |
| 2017/0057805 A1 * | 3/2017 | Bischel | F16K 37/0033 |
| 2020/0063876 A1 * | 2/2020 | DeSalvo | G06F 3/014 |

* cited by examiner

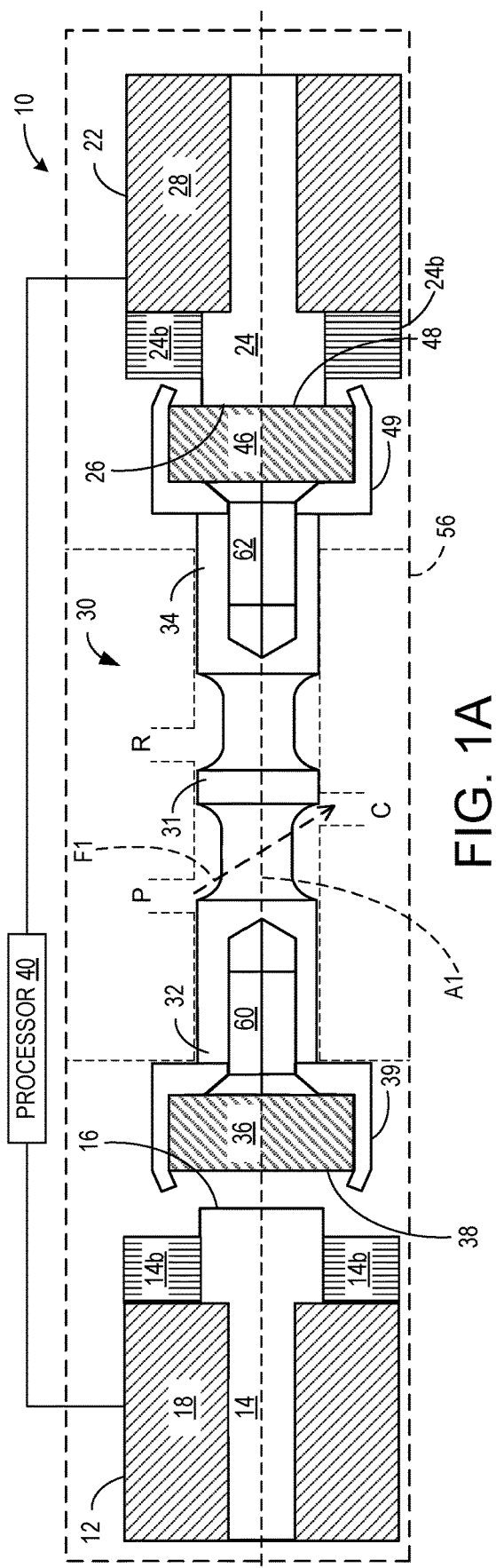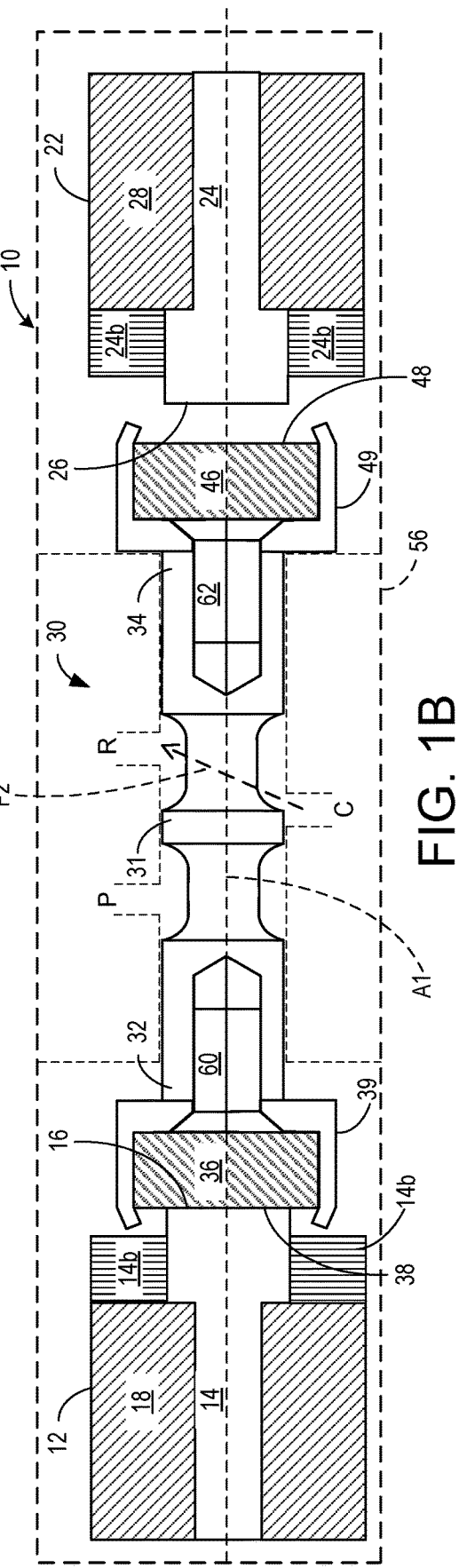

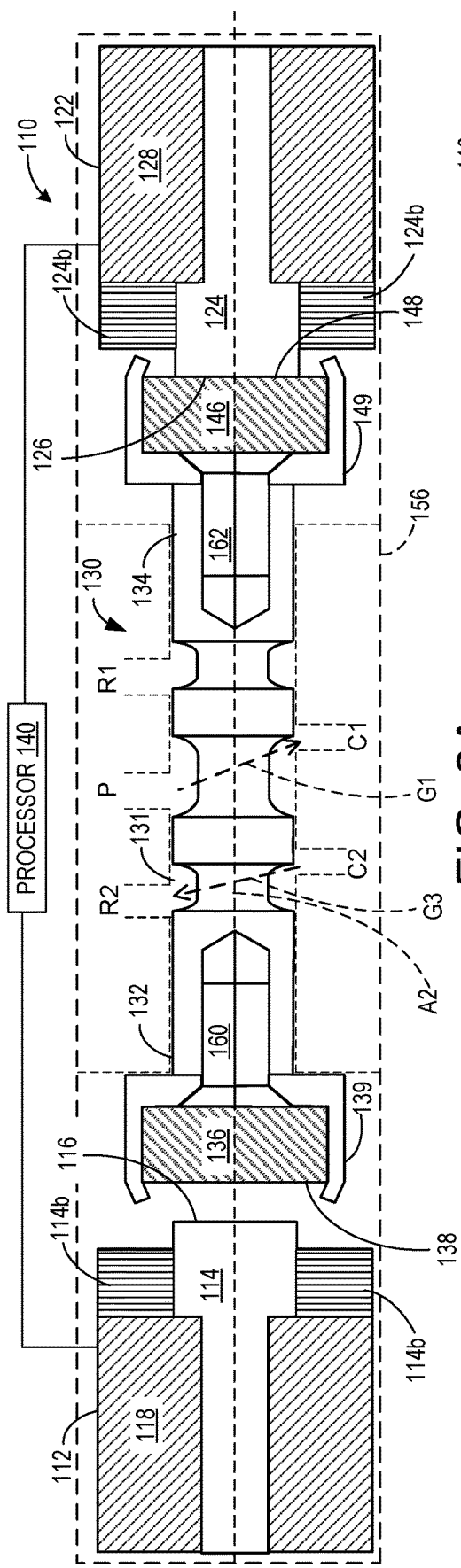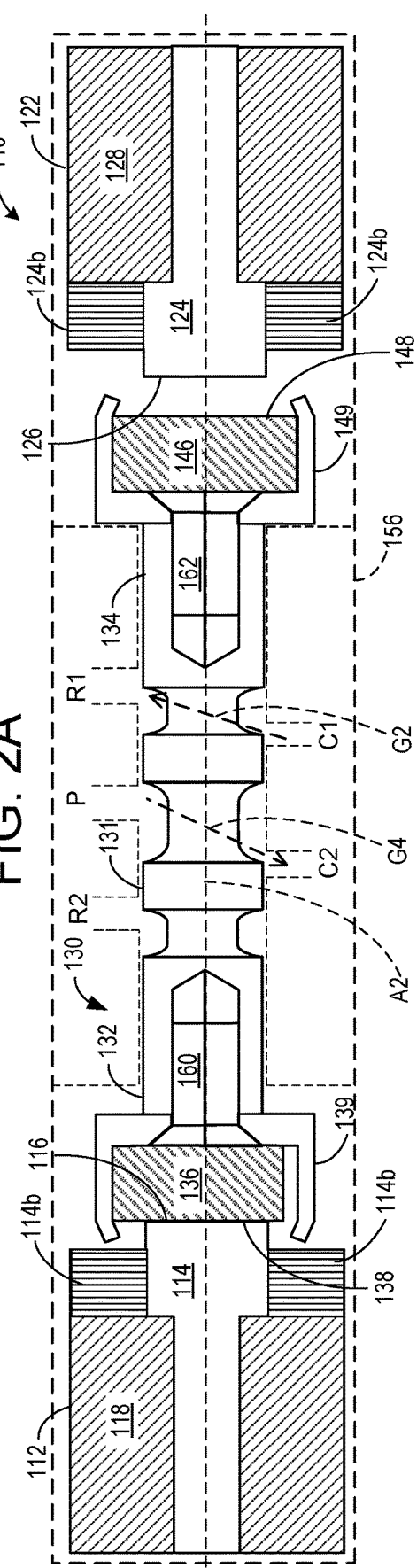

BISTABLE HYDRAULIC SOLENOID VALVE

FIELD

This disclosure relates to the field of hydraulic systems, and in particular to valves used in such systems.

BACKGROUND

Motor-operated hydraulic valves are utilized for a variety of purposes in machines including aircraft. The motors in such valves may be actuated to open and close the valve to a desired position or degree, to thereby achieve a desired flow path through the valve. While effective at such purposes, these motors can be heavy, bulky, expensive, complex to manufacture, and consume energy. In the case of such valves mounted in aircraft, the size and weight of these motors can adversely affect fuel economy. The cumulative effect of such additional size and weight of the motors in such valves across the entirety of all hydraulic systems on such aircraft can be significant.

SUMMARY

To address the above issues, according to one aspect of the subject disclosure, a hydraulic valve is provided comprising a valve body and a bistable valve spool. The valve spool is disposed within the valve body and includes a first permanent magnet attached to a first spool end of the valve spool and a second permanent magnet attached to a second spool end of the valve spool. The hydraulic valve also includes a first solenoid positioned adjacent the first spool end, and a second solenoid positioned adjacent the second spool end. In a first mode of operation, the first solenoid is energized to have a first polarity that attracts the first permanent magnet, and the second solenoid is energized to have an opposite polarity to repel the second permanent magnet to enable the first and second solenoids to concurrently push and pull the valve spool between a first position and a second position.

According to another aspect of the present disclosure, a method for operating a valve spool of a hydraulic valve is provided for a valve spool disposed within a valve body and including a first permanent magnet attached to a first spool end of the valve spool and a second permanent magnet attached to a second spool end of the valve spool, The hydraulic valve also includes a first solenoid positioned adjacent the first spool end of the valve spool, a second solenoid positioned adjacent the second spool end of the valve spool. The first solenoid and the second solenoid are cooperatively drivable to move the valve spool within the valve body to transition between a first position and a second position. The first permanent magnet is operable to maintain the valve spool in the second position and the second permanent magnet is operable to maintain the valve spool in the first position when the first solenoid and the second solenoid are de-energized. The method comprises: responsive to receiving a first instruction to move the valve spool from the second position to the first position, energizing the first solenoid and the second solenoid to cause the valve spool to move to the first position. The method also includes, responsive to receiving a second instruction to move the valve spool from the first position to the second position, energizing the first solenoid and the second solenoid to cause the valve spool to move to the second position.

According to another aspect of the present disclosure, an aircraft system comprises a pump, a hydraulic fluid reservoir, an actuator configured to control a controlled component, and a hydraulic valve fluidically coupled to the pump and the hydraulic fluid reservoir and operatively coupled to the actuator. The hydraulic valve comprises a valve body and a bistable valve spool. The valve spool is disposed within the valve body and includes a first permanent magnet attached to a first spool end of the valve spool and a second permanent magnet attached to a second spool end of the valve spool. The hydraulic valve also includes a first solenoid positioned adjacent the first spool end of the valve spool, and a second solenoid positioned adjacent the second spool end of the valve spool. The first solenoid and the second solenoid are cooperatively drivable to move the valve spool within the valve body to transition between a first position and a second position. The first permanent magnet is operable to maintain the valve spool in the second position and the second permanent magnet is operable to maintain the valve spool in the first position when the first solenoid and second solenoid are not energized.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1A shows an illustration depicting a cross-sectional view of a hydraulic valve in a first position according to a first embodiment of the subject disclosure.

FIG. 1B shows an illustration depicting a cross-sectional view of the hydraulic valve of FIG. 1A in a second position.

FIG. 2A shows an illustration depicting a cross-sectional view of a hydraulic valve in a first position according to a second embodiment of the subject disclosure.

FIG. 2B shows an illustration depicting a cross-sectional view of a hydraulic valve of FIG. 2A in a second position.

DETAILED DESCRIPTION

Figure 3:
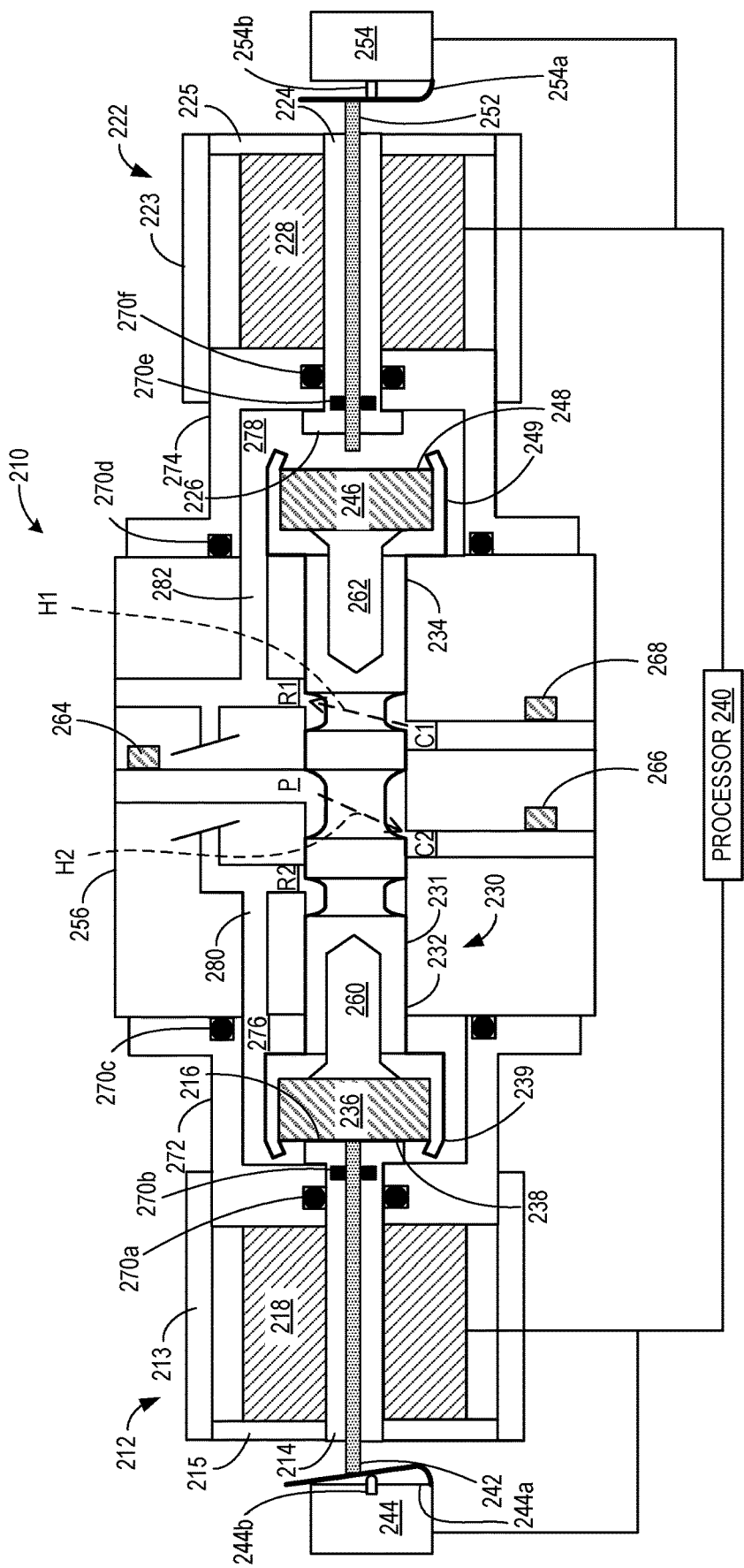
FIG. 3 shows an illustration depicting a cross-sectional view of a hydraulic valve in a second position according to a third embodiment of the subject disclosure.

In view of the considerations discussed above, referring to FIG. 1A and FIG. 1B, a three-way hydraulic valve 10 is provided comprising a valve spool 30, a first solenoid 12, a second solenoid 22, and a valve body 56 according to a first embodiment of the present disclosure. The valve spool 30 includes a spool body 31 formed along a lengthwise axis. The valve spool 30 includes a first permanent magnet 36 attached to a first spool end 32 of the spool body 31. The first permanent magnet 36 includes a first magnetic face 38. The valve spool further includes a second permanent magnet 46 attached to a second spool end 34 of the spool body 31. The second permanent magnet 46 includes a second magnetic face 48. The first spool end 32 and the second spool end 34 are disposed at opposite ends of the spool body 31. The first solenoid 12 is positioned adjacent the first spool end 32 of the valve spool 30, and the second solenoid 22 is positioned adjacent the second spool end 34 of the valve spool 30.

The first solenoid 12 includes a first core 14 including a first solenoid face 16 facing the first magnetic face 38 of the first permanent magnet 36, and a first coil 18 wound around the first core 14 and configured to produce a first magnetic flux when energized. The first core 14 includes a non-magnetic portion 14b at the periphery of the first core 14. The second solenoid 22 includes a second core 24 including a second solenoid face 26 facing the second magnetic face 48 of the second permanent magnet 46, and a second coil 28 that is wound around the second core 24 and configured to produce a second magnetic flux when energized. The second core 24 includes a non-magnetic portion 24b at the periphery of the second core 24. Each respective core 14, 24 of the first solenoid 12 and the second solenoid 22 may include steel in at least a portion thereof. The steel may be a low carbon steel with relatively high manganese content, such as 1018 cold rolled steel. The first coil 18 and the second coil 28 may comprise magnet wire.

The valve spool 30 is disposed between the first solenoid 12 and the second solenoid 22 within the valve body 56. The valve spool 30 is movable along the lengthwise axis A1 between a first position (depicted in FIG. 1A) and a second position (depicted in FIG. 1B). In other words, in a first mode of operation, the first solenoid 12 is energized to have a first polarity that attracts the first permanent magnet 36, and the second solenoid 22 is energized to have an opposite polarity that repels the second permanent magnet 46 to enable the first solenoid 12 and the second solenoid 22 to concurrently push and pull the valve spool 30 within the valve body 56 between the first position and the second position. Accordingly, the first solenoid 12 and the second solenoid 22 are cooperatively drivable to move the valve spool 30 to transition between the first position and the second position. In a second mode of operation, the second solenoid 22 is energized to have a first polarity that attracts the second permanent magnet 46, and the first solenoid 12 is energized to have the opposite polarity that repels the first permanent magnet 36 to enable the first solenoid 12 and the second solenoid 22 to concurrently pull and push the valve spool 30 between the second position and the first position. The first solenoid 12 and second solenoid 22 are energized so that the first magnetic flux generated by the first solenoid 12 and the second magnetic flux generated by the second solenoid 22 have opposite polarities, which causes one end of the valve spool 30 to be attracted to one solenoid while simultaneously causing the other end of the valve spool 30 to be repulsed from the other solenoid. The valve spool 30 is bistable so as to be maintained in either the first position by a first magnetic force generated between the second core 24 and the second permanent magnet 46, or the second position by a second magnetic force generated between the first core 14 and the first permanent magnet 36. The first permanent magnet 36 is operable to maintain the valve spool 30 in the second position, and the second permanent magnet 46 is operable to maintain the valve spool 30 in the first position when the first solenoid 12 and second solenoid 22 are de-energized.

The first permanent magnet 36 and the second permanent magnet 46 each comprises a rare-earth magnet, which may include neodymium. The first magnetic face 38 and the second magnetic face 48 may each have a diameter in a range between 0.25 and 1 inches. A thickness of the first permanent magnet 36 may be equal to a thickness of the second permanent magnet 46. A diameter of the first permanent magnet 36 may be equal to a diameter of the second permanent magnet 46. A diameter-to-thickness ratio of the first permanent magnet 36 and the second permanent magnet 46 may be between 1.5:1 and 3:1, respectively. The valve body 56 comprises steel. The steel may be a hard steel, such as 440C steel.

The first permanent magnet 36 and the second permanent magnet 46 are each secured to the valve spool 30 by a first cylindrical cup 39 and a second cylindrical cup 49, respectively. In particular the first permanent magnet 36 and the second permanent magnet 46 are secured to the first spool end 32 and the second spool end 34 of the spool body 31, respectively. In the illustrated embodiment, the first cylindrical cup 39 is secured to the valve spool 30 by a first fastener 60, and the second cylindrical cup 49 is secured to the valve spool 30 by a second fastener 62. However, in other embodiments, it will be appreciated that the first cylindrical cup 39 may be additionally or alternatively secured to the valve spool 30 via an adhesive, and the second cylindrical cup 49 may be additionally or alternatively secured to the valve spool 30 via an adhesive.

Referring to FIG. 1A, in the first position, a first flow path F1 is established through the valve body 56 and the valve spool 30 so as to enable a hydraulic fluid to flow through the first flow path F1. In the first position, the first solenoid face 16 is spaced apart from the first magnetic face 38, defining a fluid gap between the first solenoid face 16 and the first magnetic face 38, and the second solenoid face 26 is in contact with the second magnetic face 48. The valve body 56 defines a first port R, a second port P, and a third port C for the hydraulic fluid. In the first position, an inner surface of the valve spool 30 abuts the valve body 56 such that a flow of the hydraulic fluid through the first port R is stopped, and the valve spool 30 provides the first flow path F1 between the second port P and the third port C when the valve spool 30 is in the first position.

Referring to FIG. 1B, in the second position, a second flow path F2 is established through the valve body 56 and the valve spool 30 so as to enable the hydraulic fluid to flow through the second flow path F2. In the second position, the second solenoid face 26 is spaced apart from the second magnetic face 48, defining a fluid gap between the second solenoid face 26 and the second magnetic face 48, and the first solenoid face 16 is in contact with the first magnetic face 38. In the second position, the inner surface of the valve spool 30 abuts the valve body 56 such that a flow of the hydraulic fluid through the second port is stopped, and the valve spool 30 provides the second flow path F2 between the first port R and the third port C when the valve spool 30 is in the second position.

The hydraulic valve 10 is controlled by a controller and/or processor 40 operatively coupled to the first coil 18 and the second coil 28 to control the operation of both the first solenoid 12 and the second solenoid 22 to move the valve spool 30 between the first position and the second position. To position the valve spool 30 in the first position, the processor 40 energizes the second coil 28 to produce the second magnetic flux to attract the second magnetic face 48 to the second solenoid face 26, and the processor 40 causes the first coil 18 to produce the first magnetic flux, which has an opposite polarity to the second magnetic flux, to cause the first magnetic face 38 to be repelled the from the first solenoid face 16. Once the valve spool 30 is disposed in the first position, both the first solenoid 12 and the second solenoid 22 are de-energized and the valve spool 30 is maintained in the first position by a first magnetic force generated between the second core 24 and the second permanent magnet 46. To position the valve spool 30 in the second position, the processor 40 energizes the second coil 28 to produce the second magnetic flux to repel the second magnetic face 48 from the second solenoid face 26, and the processor 40 causes the first coil 18 to produce the first magnetic flux, which has an opposite polarity to the second magnetic flux, to cause the first magnetic face 38 to be attracted to the first solenoid face 16. Once the valve spool 30 is disposed in the second position, both the first solenoid 12 and the second solenoid 22 are de-energized and the valve spool 30 is maintained in the second position by a second magnetic force generated between the first core 14 and the first permanent magnet 36. Accordingly, the valve spool 30 is pushed and pulled back and forth between the first position and the second position.

The processor 40 causes the first coil 18 to produce the first magnetic flux by supplying electrical power to the first coil 18, and the processor 40 also causes the second coil 28 to produce the second magnetic flux by supplying electrical power to the second coil 28. This electrical power may be a direct current (DC) power, at 28 volts, for example. It should be realized that, in operation, the polarity of the magnetic flux generated by the first coil 18 is opposite to the polarity of the magnetic flux generated by the second coil 28. Moreover, it should be realized that the polarity of the first and second coils 18 and 28 may be reversed to enable the valve spool 30 to transition between the first and second positions. As an example, in one mode of operation, the first coil 18 may operate to pull the valve spool 30 while the second coil 28 is operated concurrently with reverse polarity to push the valve spool 30. In a second mode of operation, the first coil 18 may operate to push the valve spool 30 while the second coil 28 is operated concurrently with reverse polarity to pull the valve spool 30. The term "reverse polarity" as used herein means that the current is flowing through the first coil 18 in a first direction and the current is flowing through the second coil 28 in a second opposite direction. Thus, the direction of current through each of the first and second coils 18 and 28 may be reversed based upon the desired position of the valve spool 30.

Referring to FIG. 2A and FIG. 2B, a four-way hydraulic valve 110 is provided comprising a valve spool 130, a first solenoid 112, a second solenoid 122, and a valve body 156 according to a second embodiment of the present disclosure. The valve spool 130 includes a spool body 131 formed along a lengthwise axis A2; a first permanent magnet 136 attached to a first spool end 132 of the spool body 131 and including a first magnetic face 138; and a second permanent magnet 146 attached to a second spool end 134 of the spool body 131 and including a second magnetic face 148. The first spool end 32 and the second spool end 34 are disposed at opposite ends of the spool body 131. The first solenoid 112 is positioned adjacent the first spool end 132 of the valve spool 130, and the second solenoid 122 is positioned adjacent the second spool end 134 of the valve spool 130.

The first solenoid 112 includes a first core 114 including a first solenoid face 116 facing the first magnetic face 138 of the first permanent magnet 136, and a first coil 118 wound around the first core 114 and configured to produce a first magnetic flux when energized. The first core 114 includes a non-magnetic portion 114b at the periphery of the first core 114. The second solenoid 122 includes a second core 124 including a second solenoid face 126 facing the second magnetic face 148 of the second permanent magnet 146, and a second coil 128 that is wound around the second core 124 and configured to produce a second magnetic flux when energized. The second core 124 includes a non-magnetic portion 124b at the periphery of the second core 124. Each respective core 114, 124 of the first solenoid 112 and the second solenoid 122 may include steel in at least a portion thereof. The steel may be a low carbon steel with relatively high manganese content, such as 1018 cold rolled steel. The first coil 118 and the second coil 128 may comprise magnet wire.

The valve spool 130 is disposed between the first solenoid 112 and the second solenoid 122 in the valve body 156. The valve spool 130 is movable along the lengthwise axis A2 between a first position (depicted in FIG. 2A) and a second position (depicted in FIG. 2B). In other words, in a first mode of operation, the first solenoid 112 is energized to have a first polarity that attracts the first permanent magnet 136, and the second solenoid 122 is energized to have an opposite polarity that repels the second permanent magnet 146 to enable the first solenoid 112 and the second solenoid 122 to concurrently push and pull the valve spool 130 within the valve body 156 between the first position and the second position. Accordingly, the first solenoid 112 and the second solenoid 122 are cooperatively drivable to move the valve spool 130 to transition between the first position and the second position. In a second mode of operation, the second solenoid 122 is energized to have a the first polarity that attracts the second permanent magnet 146, and the first solenoid 112 is energized to have the opposite polarity that repels the first permanent magnet 136 to enable the first solenoid 112 and the second solenoid 122 to concurrently pull and push the valve spool 130 between the second position and the first position. The first solenoid 112 and second solenoid 122 are energized so that the first magnetic flux generated by the first solenoid 112 and the second magnetic flux generated by the second solenoid 122 have opposite polarities, which causes one end of the valve spool 130 to be attracted to one solenoid while simultaneously causing the other end of the valve spool 130 to be repulsed from the other solenoid. The valve spool 130 is bistable so as to be maintained in either the first position by a first magnetic force generated between the second core 124 and the second permanent magnet 146, or the second position by a second magnetic force generated between the first core 114 and the first permanent magnet 136. The first permanent magnet 136 is operable to maintain the valve spool 130 in the second position, and the second permanent magnet 146 is operable to maintain the valve spool 130 in the first position when the first solenoid 112 and second solenoid 122 are de-energized.

The first permanent magnet 136 and the second permanent magnet 146 may each comprise a rare-earth magnet, which may include neodymium or other material. The first magnetic face 138 and the second magnetic face 148 may each have a diameter in a range between 0.25 and 1 inches. A thickness of the first permanent magnet 136 may be equal to a thickness of the second permanent magnet 146. A diameter of the first permanent magnet 136 may be equal to a diameter of the second permanent magnet 146. A diameter-to-thickness ratio of the first permanent magnet 136 and the second permanent magnet 146 may be between 1.5:1 and 3:1, respectively. The valve body 156 comprises steel. The steel may be a hard steel, such as 440C steel.

The first permanent magnet 136 and the second permanent magnet 146 are each secured to the valve spool 130 by a first cylindrical cup 139 and a second cylindrical cup 149, respectively. In particular, the first permanent magnet 136 and the second permanent magnet 146 are secured to the first spool end 132 and the second spool end 134 of the spool body 131, respectively. In the illustrated embodiment, the first cylindrical cup 139 is secured to the valve spool 130 by a first fastener 160, and the second cylindrical cup 149 is secured to the valve spool 130 by a second fastener 162. However, in other embodiments, it will be appreciated that the first cylindrical cup 139 may be additionally or alternatively secured to the valve spool 130 via an adhesive, and the second cylindrical cup 149 may be additionally or alternatively secured to the valve spool 130 via an adhesive.

The valve body 156 defines a first port R1, a second port P, a third port R2, a fourth port C1, and a fifth port C2 for the hydraulic fluid.

Referring to FIG. 2A, in the first position, the first solenoid face 116 is spaced apart from the first magnetic face 138, defining a fluid gap between the first solenoid face 116 and the first magnetic face 138, and the second solenoid face 126 is in contact with the second magnetic face 148. An inner surface of the valve spool 130 abuts the valve body 156 such that a flow of the hydraulic fluid through the first port R1 is stopped, and the valve spool 130 provides a first fluid flow path G1 between the second port P and the fourth port C1 and a third fluid flow path G3 between the third port R2 and the fifth port C2 when the valve spool 130 is in the first position. Thus, hydraulic fluid is enabled to flow through the first fluid flow path G1 and the third fluid flow path G3 in the first position by establishing the first fluid flow path G1 and the second fluid flow path G2 through the valve spool 130 and the valve body 156.

Referring to FIG. 2B, in the second position, the second solenoid face 126 is spaced apart from the second magnetic face 148, defining a fluid gap between the second solenoid face 126 and the second magnetic face 148, and the first solenoid face 116 is in contact with the first magnetic face 138. The inner surface of the valve spool 130 abuts the valve body 156 such that a flow of the hydraulic fluid through the third port R2 is stopped, and the valve spool 130 provides the second fluid flow path G2 between the first port R1 and the fourth port C1 and a fourth fluid flow path G4 between the second port P and the fifth port C2 when the valve spool 130 is in the second position. Thus, hydraulic fluid is enabled to flow through the second fluid flow path G2 and the fourth fluid flow path G4 in the second position by establishing the second fluid flow path G2 and the fourth fluid flow path G4 through the valve spool 130 and the valve body 156.

The hydraulic valve 110 is controlled by a controller and/or processor 140 operatively coupled to the first coil 118 and the second coil 128 to control operation of both the first solenoid 112 and the second solenoid 122 to move the valve spool 130 between the first position and the second position. To position the valve spool 130 in the first position, the processor 140 energizes the second coil 128 to produce the second magnetic flux to attract the second magnetic face 148 to the second solenoid face 126, and the processor 140 causes the first coil 118 to produce the first magnetic flux, which has an opposite polarity to the second magnetic flux, to cause the first magnetic face 138 to be repelled from the first solenoid face 116. Once the valve spool 130 is disposed in the first position, both the first solenoid 112 and the second solenoid 122 are de-energized, and the valve spool 130 is maintained in the first position by a first magnetic force generated between the second core 124 and the second permanent magnet 146. To position the valve spool 130 in the second position, the processor 140 energizes the second coil 128 to produce the second magnetic flux to repel the second magnetic face 148 from the second solenoid face 126, and the processor 140 causes the first coil 118 to produce the first magnetic flux, which has an opposite polarity to the second magnetic flux, to cause the first magnetic face 138 to be attracted to the first solenoid face 116. Once the valve spool 130 is disposed in the second position, both the first solenoid 112 and the second solenoid 122 are de-energized and the valve spool 130 is maintained in the second position by a second magnetic force generated between the first core 114 and the first permanent magnet 136. Accordingly, the valve spool 130 is pushed and pulled back and forth between the first position and the second position.

The processor 140 causes the first coil 118 to produce the first magnetic flux by supplying electrical power to the first coil 118, and the processor 140 also causes the second coil 128 to produce the second magnetic flux by supplying electrical power to the second coil 128. This electrical power may be a direct current (DC) power, at 28 volts, for example. As in the first embodiment, it should be realized that, in operation, the polarity of the magnetic flux generated by the first coil 118 is opposite to the polarity of the magnetic flux generated by the second coil 128. Moreover, it should be realized that the polarity of the first and second coils 118 and 128 may be reversed to enable the valve spool 130 to transition between the first and second positions.

Referring to FIG. 3, a hydraulic valve 210 is provided comprising a valve spool 230, a first solenoid 212, a second solenoid 222, and a valve body 256 according to a third embodiment of the present disclosure. The valve spool 230 includes a spool body 231 formed along a lengthwise axis; a first permanent magnet 236 attached to a first spool end 232 of the spool body 231 and including a first magnetic face 238; and a second permanent magnet 246 attached to a second spool end 234 of the spool body 231 and including a second magnetic face 248. The first spool end 232 and the second spool end 234 are disposed at opposite ends of the spool body 231. The first solenoid 212 is positioned adjacent the first spool end 232 of the valve spool 230, and the second solenoid 222 is positioned adjacent the second spool end 234 of the valve spool 230.

The first solenoid 212 includes a first core 214 including a first solenoid face 216 facing the first magnetic face 238 of the first permanent magnet 236, and a first coil 218 wound around the first core 214 and configured to produce a first magnetic flux when energized. The first coil 218 is covered by a first coil cover 213. The first coil cover 213 may cover an entire cylindrical side surface of the first coil 218. The end of the first coil 218 is covered by first coil plate 215. A first non-magnetic support 272 is attached to the valve body 256 and cover the first spool end 232, first cylindrical cup 239, the first permanent magnet 236, and first solenoid face 216 of the first solenoid 212.

The second solenoid 222 includes a second core 224 including a second solenoid face 226 facing the second magnetic face 248 of the second permanent magnet 246, and a second coil 228 that is wound around the second core 224 and configured to produce a second magnetic flux when energized. The second coil 228 is covered by a second coil cover 223. The second coil cover 223 may cover an entire cylindrical side surface of the second coil 228. The end of the second coil 228 is covered by second coil plate 225. A second non-magnetic support 274 is attached to the valve body 256 and cover the second spool end 234, the second cylindrical cup 249, the second permanent magnet 246, and second solenoid face 226 of the second solenoid 222.

Each respective core 214, 224 of the first solenoid 212 and the second solenoid 222 may include steel in at least a portion thereof. The steel may be a low carbon steel with relatively high manganese content, such as 1018 cold rolled steel. The first coil 218 and the second coil 228 may comprise magnet wire.

The valve spool 230 is disposed between the first solenoid 212 and the second solenoid 222 in the valve body 256. The valve spool 230 is movable along the lengthwise axis between a first position (not illustrated) and a second position (depicted in FIG. 3). In other words, in a first mode of operation, the first solenoid 212 is energized to have a first polarity that attracts the first permanent magnet 236, and the second solenoid 222 is energized to have an opposite polarity that repels the second permanent magnet 246 to enable the first solenoid 212 and the second solenoid 222 to concurrently push and pull the valve spool 230 within the valve body 256 between a first position and a second position. Accordingly, the first solenoid 212 and the second solenoid 222 are cooperatively drivable to move the valve spool 230 to transition between the first position and the second position. In a second mode of operation, the second solenoid 222 is energized to have a the first polarity that attracts the second permanent magnet 246, and the first solenoid 212 is energized to have the opposite polarity that repels the first permanent magnet 236 to enable the first solenoid 212 and the second solenoid 222 to concurrently pull and push the valve spool 230 between the second position and the first position. The first solenoid 212 and second solenoid 222 are energized so that the first magnetic flux generated by the first solenoid 212 and the second magnetic flux generated by the second solenoid 222 have opposite polarities, which causes one end of the valve spool 230 to be attracted to one solenoid while simultaneously causing the other end of the valve spool 230 to be repulsed from the other solenoid. The valve spool 230 is bistable so as to be maintained in either the first position by a first magnetic force generated between the second core 224 and the second permanent magnet 246, or the second position by a second magnetic force generated between the first core 214 and the first permanent magnet 236. The first permanent magnet 236 is operable to maintain the valve spool 230 in the second position, and the second permanent magnet 246 is operable to maintain the valve spool 230 in the first position when the first solenoid 212 and second solenoid 222 are de-energized.

The first permanent magnet 236 and the second permanent magnet 246 each comprises a rare-earth magnet, which may include neodymium. The first magnetic face 238 and the second magnetic face 248 may each have a diameter in a range between 0.25 and 1 inches. A thickness of the first permanent magnet 236 may be equal to a thickness of the second permanent magnet 246. A diameter of the first permanent magnet 236 may be equal to a diameter of the second permanent magnet 246. A diameter-to-thickness ratio of the first permanent magnet 236 and the second permanent magnet 246 may be between 1.5:1 and 3:1, respectively. The valve body 256 comprises steel. The steel may be a hard steel, such as 440C steel.

The first permanent magnet 236 and the second permanent magnet 246 are each secured to the valve spool 230 by a first cylindrical cup 239 and a second cylindrical cup 249, respectively. In particular, the first permanent magnet 236 and the second permanent magnet 246 are secured to the first spool end 232 and the second spool end 234 of the spool body 231, respectively. In the illustrated embodiment, the first cylindrical cup 239 is secured to the valve spool 230 by a first fastener 260, and the second cylindrical cup 249 is secured to the valve spool 230 by a second fastener 262. However, in other embodiments, it will be appreciated that the first cylindrical cup 239 may be additionally or alternatively secured to the valve spool 230 via an adhesive, and the second cylindrical cup 249 may be additionally or alternatively secured to the valve spool 230 via an adhesive.

The valve body 256 defines a first port R1, a second port P, a third port R2, a fourth port C1, and a fifth port C2 for the hydraulic fluid.

In the second position (illustrated in FIG. 3), the second solenoid face 226 is spaced apart from the second magnetic face 248, defining a fluid gap between the second solenoid face 226 and the second magnetic face 248, and the first solenoid face 216 is in contact with the first magnetic face 238. The inner surface of the valve spool 230 abuts the valve body 256 such that a flow of the hydraulic fluid through the third port R2 is stopped, and the valve spool 230 provides a first flowing path H1 between the fourth port C1 and the first port R1 and a second flowing path H2 between the fifth port C2 and the second port P when the valve spool 230 is in the second position. Thus, hydraulic fluid is enabled to flow through the first flowing path H1 and the second flowing path H2 in the second position by establishing the first flowing path H1 and the second flowing path H2 through the valve spool 230 and the valve body 256.

In the first position (not illustrated), the first solenoid face 216 is spaced apart from the first magnetic face 238, defining a fluid gap between the first solenoid face 216 and the first magnetic face 238, and the second solenoid face 226 is in contact with the second magnetic face 248. An inner surface of the valve spool 230 abuts the valve body 256 such that a flow of the hydraulic fluid through the first port R1 is stopped, and the valve spool 230 provides a third flowing path between the fourth port C1 and the second port P and a fourth flowing path between the fifth port C2 and the third port R2 when the valve spool 230 is in the first position. Thus, hydraulic fluid is enabled to flow through the third flowing path and the fourth flowing path in the first position by establishing the third flowing path and the fourth flowing path through the valve spool 230 and the valve body 256.

The hydraulic valve 210 further comprises a first plunger 242 and a first sensor 244 provided proximate the first solenoid 212, and a second plunger 252 and a second sensor 254 provided proximate to the second solenoid 222. The first sensor 244 comprises a first sensor plate 244a and a first limit switch 244b, and the second sensor 254 comprises a second sensor plate 254a and a second limit switch 254b.

In the first position (not illustrated), the second magnetic face 248 pushes the second plunger 252 at the second solenoid face 226 to cause the second sensor 254 to detect the first position of the valve spool 230. The second sensor 254 detects the first position by the second plunger 252 depressing the second sensor plate 254a so as to press the second limit switch 254b into the body of the second sensor 254.

In the second position (illustrated in FIG. 3), the first magnetic face 238 pushes the first plunger 242 at the first solenoid face 216 to cause the first sensor 244 to detect the second position of the valve spool 230. The first sensor 244 detects the second position by the first plunger 242 depressing the first sensor plate 244a so as to press the first limit switch 244b into the body of the first sensor 244.

The first limit switch 244b may be elastically biased to push the first plunger 242 inward toward the center of the valve spool 230, and the second limit switch 254b may likewise be elastically biased to push the second plunger 252 inward toward the center of the valve spool 230. The first plunger 242 and the second plunger 252 may be non-magnetic.

The hydraulic valve 210 is controlled by a controller and/or processor 240 operatively coupled to the first coil 218 and the second coil 228 to control the operation of both the first solenoid 212 and the second solenoid 222 to move the valve spool 230 between the first position and the second position. To position the valve spool 230 in the first position, the processor 240 energizes the second coil 228 to produce the second magnetic flux to attract the second magnetic face 248 to the second solenoid face 226, and the processor 240 causes the first coil 218 to produce the first magnetic flux, which has an opposite polarity to the second magnetic flux, to cause the first magnetic face 238 to be repelled from the first solenoid face 216. Once the valve spool 230 is disposed in the first position, both the first solenoid 212 and the second solenoid 222 are de-energized and the valve spool 230 is maintained in the first position by a first magnetic force generated between the second core 224 and the second permanent magnet 246. To position the valve spool 230 in the second position, the processor 240 energizes the second coil 228 to produce the second magnetic flux to repel the second magnetic face 248 from the second solenoid face 226, and the processor 240 causes the first coil 218 to produce the first magnetic flux, which has an opposite polarity to the second magnetic flux, to cause the first magnetic face 238 to be attracted to the first solenoid face 216. Once the valve spool 230 is disposed in the second position, both the first solenoid 212 and the second solenoid 222 are de-energized and the valve spool 230 is maintained in the second position by a second magnetic force generated between the first core 214 and the first permanent magnet 236. Accordingly, the valve spool 230 is pushed back and forth between the first position and the second position.

The processor 240 is operatively coupled to the first sensor 244 to receive a detection signal from the first sensor 244 when the first sensor 244 detects the second position by the first plunger 242 depressing the first sensor plate 244a so as to press the first limit switch 244b into the body of the first sensor 244. The processor 240 is also operatively coupled to the second sensor 254 to receive a detection signal from the second sensor 254 when the second sensor 254 detects the first position by the second plunger 252 depressing the second sensor plate 254a so as to press the second limit switch 254b into the body of the second sensor 254. Accordingly, the processor 240 identifies when the hydraulic valve 210 is in the first position or the second position.

The processor 240 causes the first coil 218 to produce the first magnetic flux by supplying electrical power to the first coil 218, and the processor 240 causes the second coil 228 to produce the second magnetic flux by supplying electrical power to the second coil 228. This electrical power may be a direct current (DC) power, at 28 volts, for example. As in the first and second embodiments, it should be realized that, in operation, the polarity of the magnetic flux generated by the first coil 218 is opposite to the polarity of the magnetic flux generated by the second coil 228. Moreover, it should be realized that the polarity of the first and second coils 218 and 228 may be reversed to enable the valve spool 230 to transition between the first and second positions.

Other magnets may be provided along flow paths within the valve body 256 to capture ferrous contamination within the fluids flowing through the flow paths. For example, a third magnet 264 may be provided adjacent to a flow path that connects to the second port P, a fourth magnet 266 may be provided adjacent to a flow path that connects to the fifth port C2, and a fifth magnet 268 may be provided adjacent to a flow path that connects to the fourth port C1. The third magnet 264, fourth magnet 266, and the fifth magnet 268 are configured to magnetically attract ferrous particles within the hydraulic fluid. Accordingly, ferrous contamination may be prevented from clogging the ports of the valve spool 230.

In this embodiment, hydraulic fluid flows freely between the first hydraulic chamber 276 and the second hydraulic chamber 278. The first hydraulic chamber 276 is formed by the first non-magnetic support 272 covering the valve body 256 so as to create a sealed space for the hydraulic fluid. The first non-magnetic support 272 has a hole in which the first core 214 is accommodated. A first seal 270a and a second seal 270b provided at the first non-magnetic support 272 ensure that hydraulic fluid does not leak out of the first hydraulic chamber 276 to contaminate the first coil 218. A third seal 270c provided between the first non-magnetic support 272 and the valve body 256 ensures that hydraulic fluid does not leak out of the first hydraulic chamber 276 into a space between the first non-magnetic support 272 and the valve body 256. The first seal 270a, the second seal 270b, and the third seal 270c are configured to prevent the hydraulic fluid from leaking at high return pressures, which may be up to 600 psi.

Likewise, the second hydraulic chamber 278 is formed by the second non-magnetic support 274 covering the valve body 256 so as to create a sealed space for the hydraulic fluid. The second non-magnetic support 274 has a hole in which the second core 224 is accommodated. A fifth seal 270e and a sixth seal 270f provided at the second non-magnetic support 274 ensure that hydraulic fluid does not leak out of the second hydraulic chamber 278 to contaminate the second coil 228. A fourth seal 270d provided between the second non-magnetic support 274 and the valve body 256 ensures that hydraulic fluid does not leak out of the second hydraulic chamber 278 into a space between the second non-magnetic support 274 and the valve body 256. The fourth seal 270d, the fifth seal 270e, and the sixth seal 270f are configured to prevent the hydraulic fluid from leaking at high return pressures, which may be up to 600 psi.

Accordingly, when the hydraulic valve 210 transitions from the first position to the second position, and the second solenoid face 226 is spaced apart from the second magnetic face 248, defining a fluid gap between the second solenoid face 226 and the second magnetic face 248, hydraulic fluid flows from the first hydraulic chamber 276 through the first return flow path 280 and the second return flow path 282 to the second hydraulic chamber 278 so that the volume of fluid inside the second hydraulic chamber 278 is expanded to accommodate the fluid gap. Likewise, when the hydraulic valve 210 transitions from the second position to the first position, and the first solenoid face 216 is spaced apart from the first magnetic face 238, defining a fluid gap between the first solenoid face 216 and the first magnetic face 238, hydraulic fluid flows from the second hydraulic chamber 278 through the second return flow path 282 and the first return flow path 280 to the first hydraulic chamber 276 so that the volume of fluid inside the first hydraulic chamber 276 is expanded to accommodate the fluid gap. Accordingly, the first return flow path 280 and the second return flow path 282 prevent fluid pressures inside the first hydraulic chamber 276 and the second hydraulic chamber 278 from spiking, thereby keeping the ends of the valve spool 230 wet and return pressures relatively low.

Figure 4A:
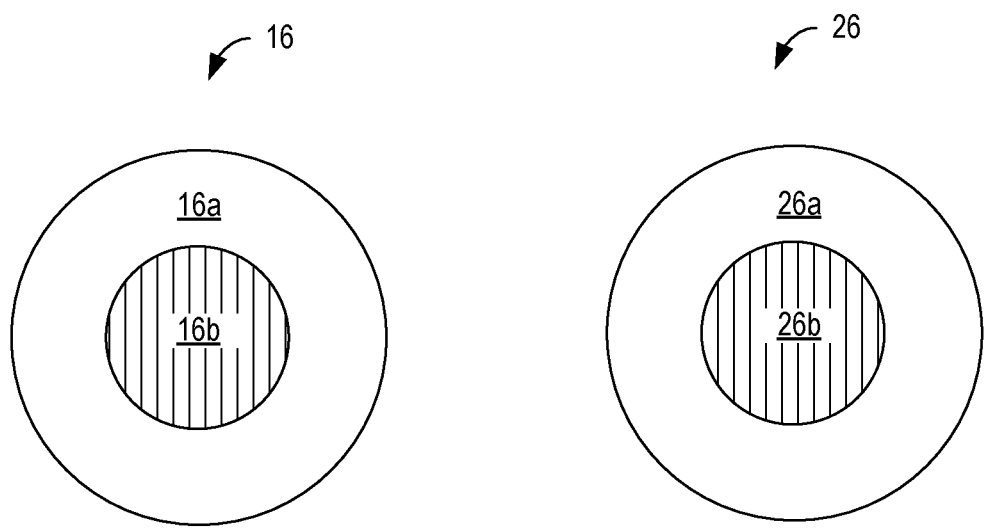
FIG. 4A shows exemplary axial views of solenoid faces of the first and second solenoids, respectively, according to the first and second embodiments of the subject disclosure.

Referring to FIG. 4A, exemplary axial views of the first solenoid face 16 and the second solenoid face 26 of the first embodiment of the present disclosure are depicted. Although not illustrated, it will be appreciated that the exemplary axial views of the first solenoid face 116 and the second solenoid face 126 of the second embodiment would be depicted similarly to FIG. 4A. The first solenoid face 16 comprises a non-magnetic material along a circumference 16a of the first solenoid face 16 and steel at a central portion 16b of the first solenoid face 16. An area of the central portion 16b may be equal to or smaller than an area of the first magnetic face 38. Likewise, the second solenoid face 26 comprises a non-magnetic material along a circumference 26a of the second solenoid face 26 and steel at a central portion 26b of the second solenoid face 26. An area of the central portion 26b may be equal to or smaller than an area of the second magnetic face 48.

Figure 4B:
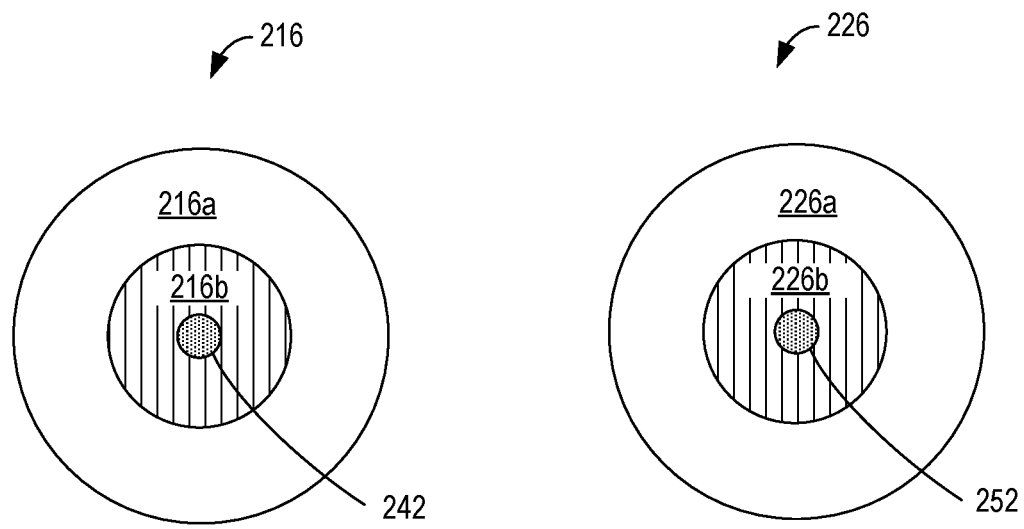
FIG. 4B shows exemplary axial views of solenoid faces of the first and second solenoids, respectively, according to the third embodiment of the subject disclosure.

Referring to FIG. 4B, the exemplary axial views of the first solenoid face 216 and the second solenoid face 226 of the third embodiment of the present disclosure are depicted. Like the first embodiment and the second embodiment, the first solenoid face 216 comprises a non-magnetic material along a circumference 216a of the first solenoid face 216 and steel at a central portion 216b of the first solenoid face 216. An area of the central portion 216b may be equal to or smaller than an area of the first magnetic face 238. Likewise, the second solenoid face 226 comprises a non-magnetic material along a circumference 226a of the second solenoid face 226 and steel at a central portion 226b of the second solenoid face 226. An area of the central portion 226b may be equal to or smaller than an area of the second magnetic face 248. A first plunger 242 is provided at a center of the central portion 216b of the first solenoid face 216, so that the first plunger 242 protrudes outward from the first solenoid face 216 when not depressed by the first magnetic face 238. Likewise, a second plunger 252 is provided at a center of the central portion 226b of the second solenoid face 226, so that the second plunger 252 protrudes outward from the second solenoid face 226 when not depressed by the second magnetic face 248.

Figure 5:
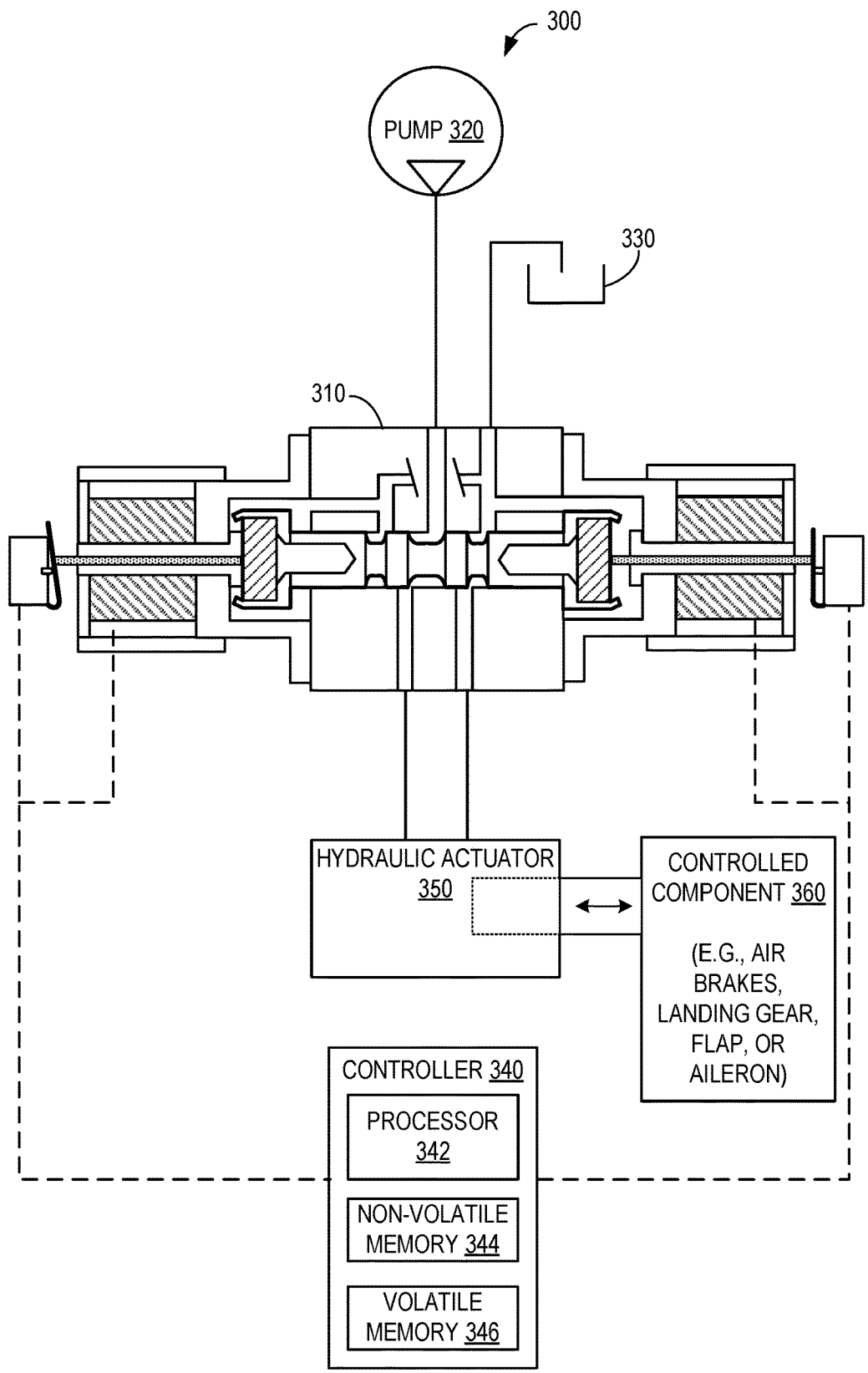
FIG. 5 shows a diagram depicting an example embodiment of a use of the hydraulic valve of the first embodiment, the second embodiment, or the third embodiment according to the subject disclosure.

FIG. 5 illustrates an exemplary system 300 incorporating a hydraulic valve according to the first embodiment, the second embodiment, or the third embodiment of the subject disclosure. The system 300 comprises a pump 320, a hydraulic fluid reservoir 330 containing hydraulic fluid, an actuator 350 configured to control a controlled component 360, and a hydraulic valve 310 fluidically coupled to the pump 320, the hydraulic fluid reservoir 330, and the actuator 350. The hydraulic valve 310 may be selected from the group consisting of a pilot valve, a shutoff valve, a cutoff valve, and a control valve. It will be appreciated that these valve types refer to the usage scenario for the valve rather than the structure of the valve itself. The controlled component 360, which is mechanically coupled to the hydraulic actuator 350, may be selected from the group consisting of air brakes, a landing gear, a flap, and an aileron. A controller 340, which comprises a processor 342, non-volatile memory 344, and volatile memory 346, is operatively coupled to the hydraulic valve 310 and configured to control the hydraulic valve 310 to transition between a first position and a second position. The processor 342 executes instructions stored in the non-volatile memory 344 to control the hydraulic valve 310 to transition between the first position and the second position in accordance with a method described in FIG. 7, for example. When the hydraulic valve 310 is in the first position, a first hydraulic fluid path is established to cause the hydraulic actuator 350 to operate the controlled component 360 to transition to a first state and when the hydraulic valve 310 is in the second position, a second hydraulic fluid path is established to cause the hydraulic actuator 350 to operate the controlled component 360 to transition to a second state, for example. Although the hydraulic valve 310 of the system 300 is depicted as a four-way hydraulic valve with five ports and four possible fluid flow paths, it is appreciated that the system 300 is not particularly limited to this port and fluid path configuration, and the system 300 may alternatively include a hydraulic valve with three ports and two possible fluid flow paths as described in the first embodiment, for example.

The processor 342 includes one or more physical devices configured to execute instructions. For example, the processor 342 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processor 342 may include one or more physical processors (hardware) configured to execute software instructions. Additionally or alternatively, the processor 342 may include one or more hardware logic circuits or firmware devices configured to execute hardware-implemented logic or firmware instructions. The processor 342 may include a plurality of processors that may be single-core or multi-core, and the instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration. In such a case, these virtualized aspects are run on different physical logic processors of various different machines, it will be understood.

Non-volatile memory 344 includes one or more physical devices configured to hold instructions executable by the logic processors to implement the methods and processes described herein. When such methods and processes are implemented, the state of non-volatile memory 344 may be transformed—e.g., to hold different data.

Non-volatile memory 344 may include physical devices that are removable and/or built-in. Non-volatile memory 344 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile memory 344 may include nonvolatile, dynamic, static, read/write, read-only, sequential-access, location-addressable, file-addressable, and/or content-addressable devices. It will be appreciated that non-volatile memory 344 is configured to hold instructions even when power is cut to the non-volatile memory 344.

Aspects of processor 342, non-volatile memory 344, and volatile memory 346 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Figure 6:
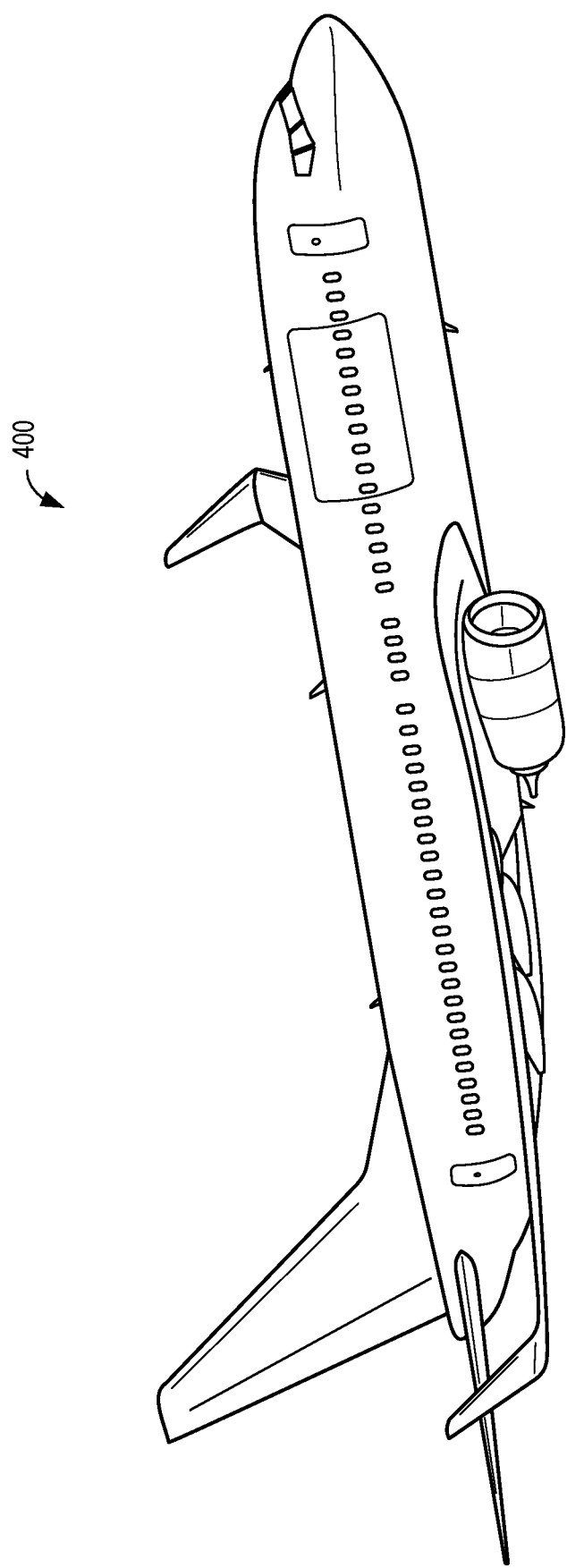
FIG. 6 is a schematic illustration of an exemplary aircraft in accordance with the first embodiment, the second embodiment, or the third embodiment according to the subject disclosure.

FIG. 6 is a schematic illustration of an exemplary aircraft 400 in accordance with the first embodiment, the second embodiment, or the third embodiment according to the subject disclosure. It will be appreciated that the hydraulic valve of the first embodiment, the second embodiment, or the third embodiment may be incorporated into an exemplary system 300 of the exemplary aircraft 400 as described with reference to FIG. 5.

Figure 7:
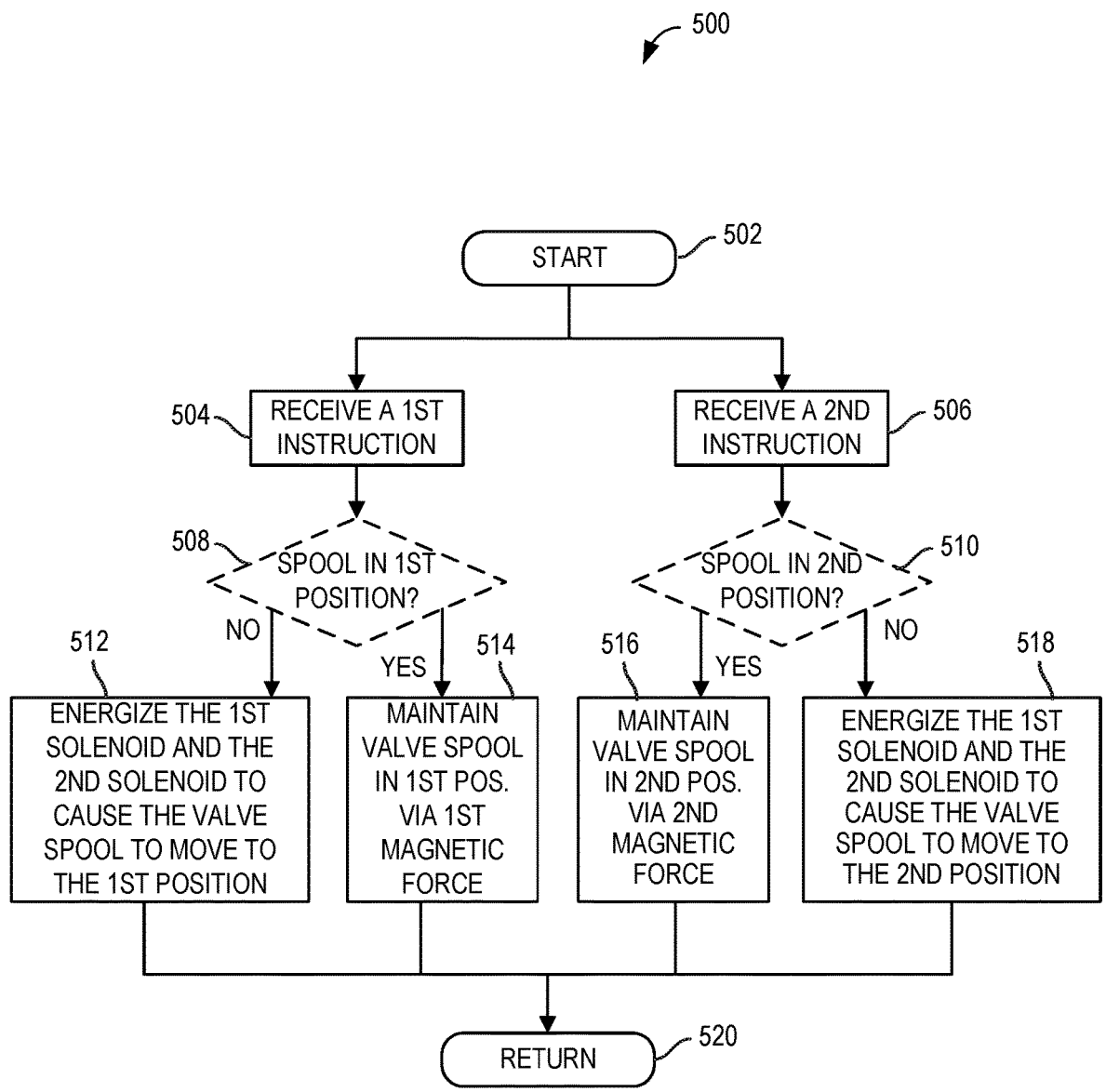
FIG. 7 shows an illustration of operations of a method performed according to an example embodiment of the subject disclosure.

FIG. 7 illustrates a flow chart of an example configuration of a method 500 according to one aspect of the subject disclosure. The following description of method 500 is provided with reference to the software and hardware components described above and shown in FIGS. 1A, 1B, 2A, 2B, 3, 4A, 4B, and 5. It will be appreciated that method 500 also can be performed in other contexts using other suitable hardware and software components. The method 500 is for operating a valve spool of a hydraulic valve, the valve spool disposed within a valve body and including a first permanent magnet attached to a first spool end of the valve spool and a second permanent magnet attached to a second spool end of the valve spool. A first solenoid is positioned adjacent the first spool end of the valve spool, and a second solenoid is positioned adjacent the second spool end of the valve spool. The first solenoid and the second solenoid are cooperatively drivable to move the valve spool within the valve body to transition between a first position and a second position. The first permanent magnet is operable to maintain the valve spool in the second position and the second permanent magnet is operable to maintain the valve spool in the first position when the first solenoid and the second solenoid are de-energized, according to the subject disclosure.

At step 502, the method 500 starts. At step 504, the controller receives a first instruction. At step 508, responsive to receiving the first instruction to move the valve spool from the second position to the first position, the controller may determine whether the valve spool is in the first position. This determination may be performed by the controller by receiving detection signals from a first sensor that detects contact between a first solenoid face and a first magnetic face, and/or by receiving detection signals from a second sensor that detects contact between a second solenoid face and a second magnetic face. However, it will be appreciated that this determination step 508 may be omitted in alternative embodiments. When it is determined that the valve spool is not in the first position, at step 512, the controller energizes the first solenoid and the second solenoid to cause the valve spool to move to the first position by establishing a first flow path in the valve body and the valve spool to enable a hydraulic fluid to flow through the first flow path. The first flow path may be established by energizing the second coil to produce a second magnetic flux to attract the second magnetic face to the second solenoid face, and energizing the first coil to produce a first magnetic flux to repel the first magnetic face from the first solenoid face. When it is determined that the valve spool is in the first position, at step 514, the controller maintains the valve spool in the first position via a first magnetic force.

At step 506, the controller receives a second instruction. At step 510, responsive to receiving the second instruction to move the valve spool from the first position to the second position, the controller may determine whether the valve spool is in the second position. This determination may be performed by the controller by receiving detection signals from a first sensor that detects contact between a first solenoid face and a first magnetic face, and/or by receiving detection signals from a second sensor that detects contact between a second solenoid face and a second magnetic face. However, it will be appreciated that this determination step 510 may be omitted in alternative embodiments. When it is determined that the valve spool is not in the second position, at step 518, the controller energizes the first solenoid and the second solenoid to cause the valve spool to move to the second position, thereby establishing a second flow path through the valve body and the valve spool to enable the hydraulic fluid to flow through the second flow path. The second flow path may be established by supplying electrical power to the second coil to produce the second magnetic flux to repel the second magnetic face from the second solenoid face, and supplying electrical power to the first coil to produce the first magnetic flux to attract the first magnetic face to the first solenoid face. When it is determined that the valve spool is already in the second position, at step 516, the controller maintains the valve spool in the second position via a second magnetic force. At step 520 the method 500 returns to the first step 502.

The systems and processes described herein have the potential benefits of increasing reliability, lowering weight, lowering energy consumption, and lowering material and manufacturing costs. Intermittent electrical power biases the magnets in the desired magnetic orientations to maintain a desired position of the valve spool. Since the hydraulic solenoid valve of the subject disclosure is bistable, compared to hydraulic valves that are constantly provided with electrical power to keep the hydraulic valves in one position, energy consumption is significantly reduced. Moreover, the mechanical configuration of the hydraulic valve is simplified in comparison to motor-operated hydraulic valves, thereby resulting in savings in material and manufacturing costs, as well as increased reliability and reduced weight.

Further, the disclosure comprises configurations according to the following clauses.

Clause 1. A hydraulic valve, comprising: a valve body; a bistable valve spool disposed within the valve body and including a first permanent magnet attached to a first spool end of the valve spool and a second permanent magnet attached to a second spool end of the valve spool; a first solenoid positioned adjacent the first spool end; and a second solenoid positioned adjacent the second spool end, wherein in a first mode of operation, the first solenoid is energized to have a first polarity that attracts the first permanent magnet, and the second solenoid is energized to have an opposite polarity that repels the second permanent magnet to enable the first and second solenoids to concurrently push and pull the valve spool between a first position and a second position.

Clause 2. The hydraulic valve of clause 1, wherein in a second mode of operation, the second solenoid is energized to have the first polarity that attracts the second permanent magnet, and the first solenoid is energized to have the opposite polarity that repels the first permanent magnet to enable the first and second solenoids to concurrently pull and push the valve spool between the second position and the first position.

Clause 3. The hydraulic valve of any of clause 1 or 2, wherein the first permanent magnet is operable to maintain the valve spool in the second position and the second permanent magnet is operable to maintain the valve spool in the first position when the first solenoid and second solenoid are de-energized.

Clause 4. The hydraulic valve of any of clauses 1 to 3, wherein the first solenoid includes a first core facing the first permanent magnet; the second solenoid includes a second core facing the second permanent magnet; in the first position, the first solenoid is spaced apart from the first permanent magnet and the second solenoid is in contact with the second permanent magnet; and in the second position, the second solenoid is spaced apart from the second permanent magnet and the first solenoid is in contact with the first permanent magnet.

Clause 5. The hydraulic valve of any of clauses 1 to 4, further comprising: a first plunger and a first sensor provided in the first solenoid; and a second plunger and a second sensor provided in the second solenoid, wherein in the first position, a second magnetic face of the second permanent magnet pushes the second plunger at a second solenoid face of the second solenoid to cause the second sensor to detect the first position of the valve spool; and in the second position, a first magnetic face of the first permanent magnet pushes the first plunger at a first solenoid face of the first solenoid to cause the first sensor to detect the second position of the valve spool.

Clause 6. The hydraulic valve of any of clauses 1 to 5, wherein the valve body defines a first port, a second port, and a third port; in the first position, the valve spool provides a first flow path between the second port and the third port; and in the second position, the valve spool provides a second flow path between the first port and the third port.

Clause 7. The hydraulic valve of any of clauses 1 to 6, wherein a third magnet is provided adjacent to at least a flow path within the valve body and configured to magnetically attract ferrous particles within a hydraulic fluid in the flow path.

Clause 8. The hydraulic valve of any of clauses 1 to 7, wherein a first magnetic face of the first permanent magnet and a second magnetic face of the second permanent magnet each have a diameter in a range between 0.25 and 1 inches.

Clause 9. The hydraulic valve of any of clauses 1 to 8, wherein a diameter-to-thickness ratio of the first permanent magnet and the second permanent magnet is between 1.5:1 and 3:1, respectively.

Clause 10. The hydraulic valve of any of clauses 1 to 9, wherein each respective core of the first solenoid and the second solenoid includes steel in at least a portion thereof.

Clause 11. The hydraulic valve of any of clauses 1 to 10, wherein a first solenoid face of the first solenoid and a second solenoid face of the second solenoid each comprise a nonmagnetic material along a circumference of the respective face thereof and steel at a central portion of the respective face.

Clause 12. The hydraulic valve of any of clauses 1 to 11, wherein an area of the central portion is equal to or smaller than an area of each of a first magnetic face of the first permanent magnet and a second magnetic face of the second permanent magnet, respectively.

Clause 13. The hydraulic valve of any of clauses 1 to 12, wherein the first permanent magnet is securely coupled to the first spool end by a first non-magnetic cup, and the second permanent magnet is securely coupled to the second spool end by a second non-magnetic cup.

Clause 14. A method for operating a bistable valve spool of a hydraulic valve, the valve spool disposed within a valve body and including a first permanent magnet attached to a first spool end of the valve spool and a second permanent magnet attached to a second spool end of the valve spool, a first solenoid positioned adjacent the first spool end of the valve spool; a second solenoid positioned adjacent the second spool end of the valve spool; the first solenoid and the second solenoid cooperatively drivable to move the valve spool to transition between a first position and a second position, the first permanent magnet operable to maintain the valve spool in the second position and the second permanent magnet operable to maintain the valve spool in the first position when the first solenoid and the second solenoid are de-energized, the method comprising: responsive to receiving a first instruction to move the valve spool from the second position to the first position, energizing the first solenoid and the second solenoid to cause the valve spool to move to the first position; and responsive to receiving a second instruction to move the valve spool from the first position to the second position, energizing the first solenoid and the second solenoid to cause the valve spool to move to the second position.

Clause 15. The method of clause 14, wherein to position the valve spool in the first position, the second solenoid is energized to produce a second magnetic flux to attract the second permanent magnetic to the second solenoid, and the first solenoid is energized to produce a first magnetic flux to cause the first permanent magnet to be repelled from the first solenoid, the valve spool maintained in the first position by a first magnetic force generated between the second solenoid and the second permanent magnet; and to position the valve spool in the second position, the second solenoid is energized to produce the second magnetic flux to repel the second permanent magnet from the second solenoid, and the first solenoid is energized to produce the first magnetic flux to cause the first permanent magnet to be attracted to the first solenoid, the valve spool maintained in the second position by a second magnetic force generated between the first solenoid and the first permanent magnet.

Clause 16. The method of any of clause 14 or 15, wherein in the first position, a flow of hydraulic fluid through a first port of the valve body is stopped by the valve spool, and a first flow path between a second port and a third port of the valve body is enabled by the valve spool; and in the second position, a flow of hydraulic fluid through the second port of the valve body is stopped by the valve spool, and a second flow path between the first port and the third port of the valve body is enabled by the valve spool.

Clause 17. The method of any of clauses 14 to 16, wherein in the first position, a flow of hydraulic fluid through a first port of the valve body is stopped, and the valve spool enables a first flow path between a second port and a fourth port of the valve body and a third flow path between a third port and a fifth port of the valve body; and in the second position, a flow of the hydraulic fluid through the third port is stopped, and the valve spool enables a second flow path between the first port and the fourth port and a fourth flow path between the second port and the fifth port.

Clause 18. An aircraft system comprising: a pump; a hydraulic fluid reservoir; an actuator configured to control a controlled component; and a hydraulic valve fluidically coupled to the pump, the hydraulic fluid reservoir, and the actuator, the hydraulic valve comprising: a valve body; a bistable valve spool disposed within the valve body and including a first permanent magnet attached to a first spool end of the valve spool and a second permanent magnet attached to a second spool end of the valve spool; a first solenoid positioned adjacent the first spool end of the valve spool; and a second solenoid positioned adjacent the second spool end of the valve spool, wherein the first solenoid and the second solenoid are cooperatively drivable to move the valve spool to transition between a first position and a second position; and the first permanent magnet is operable to maintain the valve spool in the second position and the second permanent magnet is operable to maintain the valve spool in the first position when the first solenoid and second solenoid are de-energized.

Clause 19. The aircraft system of clause 18, wherein the hydraulic valve is selected from the group consisting of a pilot valve, a shutoff valve, a cutoff valve, and a control valve.

Clause 20. The aircraft system of any of clause 18 or 19, wherein the controlled component is selected from the group consisting of brakes, a landing gear, a flap, and an aileron.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A hydraulic valve, comprising:
a valve body;
an actuator configured to control a controlled component;
a bistable valve spool disposed within the valve body and including a first permanent magnet attached to a first spool end of the valve spool and a second permanent magnet attached to a second spool end of the valve spool;
a first solenoid positioned adjacent the first spool end;
a second solenoid positioned adjacent the second spool end;
a first plunger and a first sensor provided in the first solenoid, the first plunger extending down a center of magnetic materials of the first solenoid; and
a second plunger and a second sensor provided in the second solenoid, the second plunger extending down a center of magnetic materials of the second solenoid, wherein
in a first mode of operation, the first solenoid is energized to have a first polarity that attracts the first permanent magnet, and the second solenoid is energized to have an opposite polarity that repels the second permanent magnet to enable the first and second solenoids to concurrently push and pull the valve spool between a first position and a second position;
in the first position, a second magnetic face of the second permanent magnet pushes the second plunger at a second solenoid face of the second solenoid to cause the second sensor to detect the first position of the valve spool; and
in the second position, a first magnetic face of the first permanent magnet pushes the first plunger at a first solenoid face of the first solenoid to cause the first sensor to detect the second position of the valve spool.

2. The hydraulic valve of claim 1, wherein in a second mode of operation, the second solenoid is energized to have the first polarity that attracts the second permanent magnet, and the first solenoid is energized to have the opposite polarity that repels the first permanent magnet to enable the first and second solenoids to concurrently pull and push the valve spool between the second position and the first position.

3. The hydraulic valve of claim 1, wherein the first permanent magnet is operable to maintain the valve spool in the second position and the second permanent magnet is operable to maintain the valve spool in the first position when the first solenoid and second solenoid are de-energized.

4. The hydraulic valve of claim 1, wherein
the first solenoid includes a first core facing the first permanent magnet;
the second solenoid includes a second core facing the second permanent magnet;
in the first position, the first solenoid is spaced apart from the first permanent magnet and the second solenoid is in contact with the second permanent magnet; and
in the second position, the second solenoid is spaced apart from the second permanent magnet and the first solenoid is in contact with the first permanent magnet.

5. The hydraulic valve of claim 1, wherein
the valve body defines a first port, a second port, and a third port;
in the first position, the valve spool provides a first flow path between the second port and the third port; and
in the second position, the valve spool provides a second flow path between the first port and the third port.

6. The hydraulic valve of claim 1, wherein
a third magnet is provided adjacent to at least a flow path within the valve body and configured to magnetically attract ferrous particles within a hydraulic fluid in the flow path.

7. The hydraulic valve of claim 1, wherein
the first magnetic face of the first permanent magnet and the second magnetic face of the second permanent magnet each have a diameter in a range between 0.25 and 1 inches.

8. The hydraulic valve of claim 1, wherein
a diameter-to-thickness ratio of the first permanent magnet and the second permanent magnet is between 1.5:1 and 3:1, respectively.

9. The hydraulic valve of claim 1, wherein
each respective core of the first solenoid and the second solenoid includes steel in at least a portion thereof.

10. The hydraulic valve of claim 1, wherein
the first solenoid face of the first solenoid and the second solenoid face of the second solenoid each comprise a nonmagnetic material along a circumference of the respective face thereof and steel at a central portion of the respective face.

11. The hydraulic valve of claim 10, wherein
an area of the central portion is equal to or smaller than an area of each of the first magnetic face of the first permanent magnet and the second magnetic face of the second permanent magnet, respectively.

12. The hydraulic valve of claim 1, wherein
the first permanent magnet is securely coupled to the first spool end by a first non-magnetic cup, and the second permanent magnet is securely coupled to the second spool end by a second non-magnetic cup.

13. The hydraulic valve of claim 1, wherein the actuator configured to control the controlled component is a hydraulic actuator configured to transition the controlled component between a first state and a second state.

14. A method for operating a bistable valve spool of a hydraulic valve, the valve spool disposed within a valve body and including a first permanent magnet attached to a first spool end of the valve spool and a second permanent magnet attached to a second spool end of the valve spool, a first solenoid positioned adjacent the first spool end of the valve spool, a first sensor and a first plunger provided in the first solenoid and extending down a center of magnetic materials of the first solenoid; a second solenoid positioned adjacent the second spool end of the valve spool, a second sensor and a second plunger provided in the second solenoid and extending down a center of magnetic materials of the second solenoid; the first solenoid and the second solenoid cooperatively drivable to move the valve spool to transition between a first position and a second position, the first permanent magnet operable to maintain the valve spool in the second position and the second permanent magnet operable to maintain the valve spool in the first position when the first solenoid and the second solenoid are de-energized, the method comprising:
responsive to receiving a first instruction to move the valve spool from the second position to the first position, energizing the first solenoid and the second solenoid to cause the valve spool to move to the first position, so that a second magnetic face of the second permanent magnet pushes the second plunger at a second solenoid face of the second solenoid to cause the second sensor to detect the first position of the valve spool and control a controlled component; and
responsive to receiving a second instruction to move the valve spool from the first position to the second position, energizing the first solenoid and the second solenoid to cause the valve spool to move to the second position, so that a first magnetic face of the first permanent magnet pushes the first plunger at a first solenoid face of the first solenoid to cause the first sensor to detect the second position of the valve spool and control the controlled component.

15. The method of claim 14, wherein
to position the valve spool in the first position, the second solenoid is energized to produce a second magnetic flux to attract the second permanent magnet to the second solenoid, and the first solenoid is energized to produce a first magnetic flux to cause the first permanent magnet to be repelled from the first solenoid, the valve spool maintained in the first position by a first magnetic force generated between the second solenoid and the second permanent magnet; and
to position the valve spool in the second position, the second solenoid is energized to produce the second magnetic flux to repel the second permanent magnet from the second solenoid, and the first solenoid is energized to produce the first magnetic flux to cause the first permanent magnet to be attracted to the first solenoid, the valve spool maintained in the second position by a second magnetic force generated between the first solenoid and the first permanent magnet.

16. The method of claim 14, wherein
in the first position, a flow of hydraulic fluid through a first port of the valve body is stopped by the valve spool, and a first flow path between a second port and a third port of the valve body is enabled by the valve spool; and
in the second position, a flow of hydraulic fluid through the second port of the valve body is stopped by the valve spool, and a second flow path between the first port and the third port of the valve body is enabled by the valve spool.

17. The method of claim 14, wherein
in the first position, a flow of hydraulic fluid through a first port of the valve body is stopped, and the valve spool enables a first flow path between a second port and a fourth port of the valve body and a third flow path between a third port and a fifth port of the valve body; and
in the second position, a flow of the hydraulic fluid through the third port is stopped, and the valve spool enables a second flow path between the first port and the fourth port and a fourth flow path between the second port and the fifth port.

18. An aircraft system comprising:
a pump;
a hydraulic fluid reservoir;
an actuator configured to control a controlled component; and
a hydraulic valve fluidically coupled to the pump, the hydraulic fluid reservoir, and the actuator, the hydraulic valve comprising:
a valve body;
a bistable valve spool disposed within the valve body and including a first permanent magnet attached to a first spool end of the valve spool and a second permanent magnet attached to a second spool end of the valve spool;
a first solenoid positioned adjacent the first spool end of the valve spool, a first plunger and a first sensor provided in the first solenoid, the first plunger extending down a center of magnetic materials of the first solenoid; and
a second solenoid positioned adjacent the second spool end of the valve spool, a second plunger and a second sensor provided in the second solenoid, the second plunger extending down a center of magnetic materials of the second solenoid, wherein
the first solenoid and the second solenoid are cooperatively drivable to move the valve spool to transition between a first position and a second position;
the first permanent magnet is operable to maintain the valve spool in the second position and the second permanent magnet is operable to maintain the valve spool in the first position when the first solenoid and second solenoid are de-energized
in the first position, a second magnetic face of the second permanent magnet pushes the second plunger at a second solenoid face of the second solenoid to cause the second sensor to detect the first position of the valve spool; and
in the second position, a first magnetic face of the first permanent magnet pushes the first plunger at a first solenoid face of the first solenoid to cause the first sensor to detect the second position of the valve spool.

19. The aircraft system of claim 18, wherein the hydraulic valve is selected from the group consisting of a pilot valve, a shutoff valve, a cutoff valve, and a control valve.

20. The aircraft system of claim 18, wherein the actuator configured to control the controlled component is a hydraulic actuator configured to transition the controlled component between a first state and a second state.

* * * * *